United States Patent Office 3,421,087
Patented Jan. 7, 1969

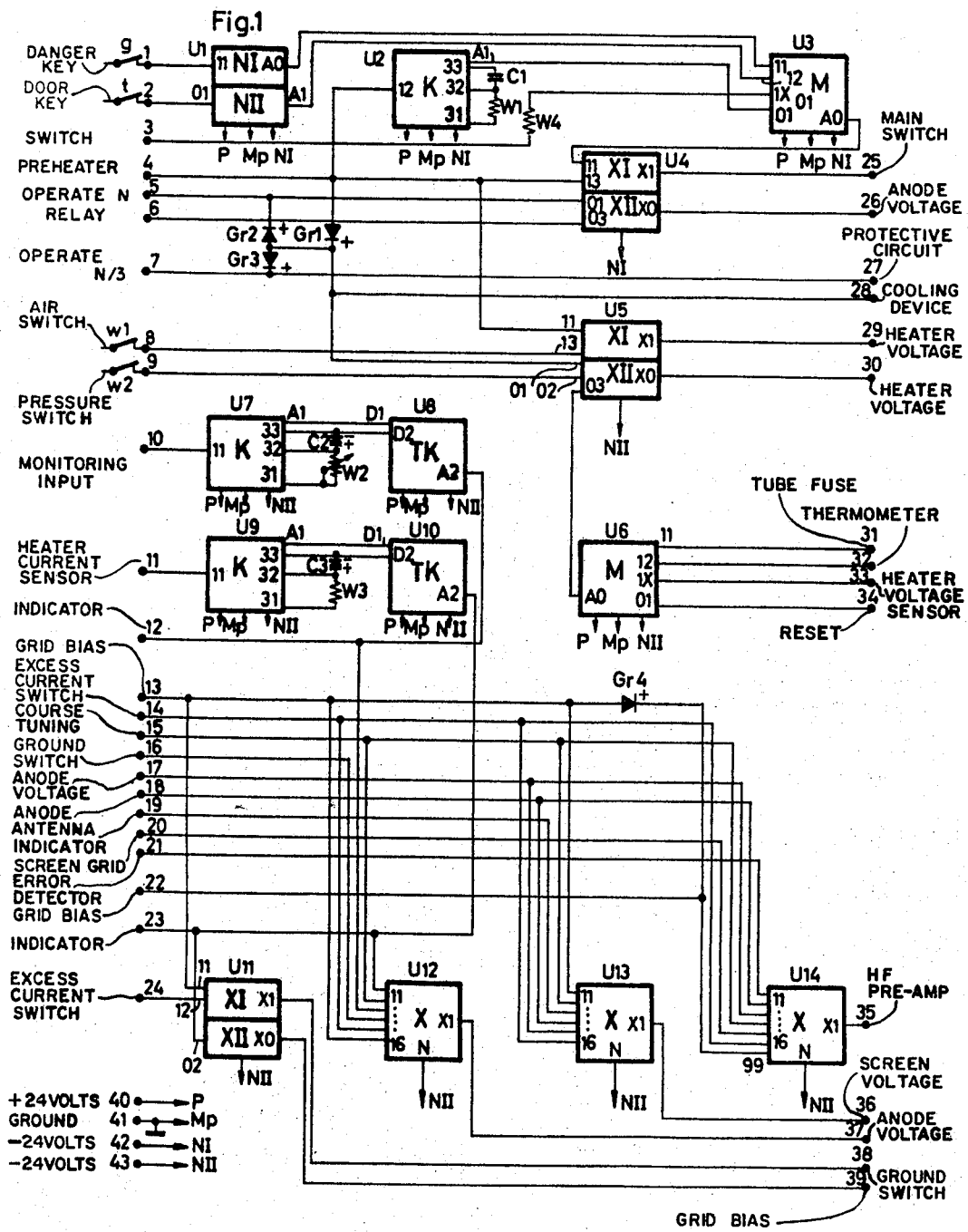

3,421,087
CURRENT SUPPLY FOR TRANSMITTERS
Rudiger Schünemann, Berlin-Halensee, and Oskar Sippekamp, Berlin, Germany, assignors to Siemens Aktiengesellschaft, Munich, Germany, a corporation of Germany
Continuation of application Ser. No. 294,916, July 15, 1963. This application Oct. 23, 1967, Ser. No. 678,156
Claims priority, application Germany, July 19, 1962, S 80,486
U.S. Cl. 325—151                  7 Claims
Int. Cl. H04b *1/04;* H04b *1/66;* H02h *7/20*

ABSTRACT OF THE DISCLOSURE

Semiconductor logic circuits are used to control the application of power to the various stages of a transmitter. Three control states may be selected for preheating (warmup), operation at one-third power and operation at full power. The application of plate, bias and heater voltages is controlled by an assembly of "and" gates whose inputs are responsive to the presence of the supply voltages and to abnormal condition sensors such as a loss of cooling air pressure, excess screen grid, or plate current and tuning errors. Personnel protection is also effected through the use of door and danger switches.

---

Figure 2A:
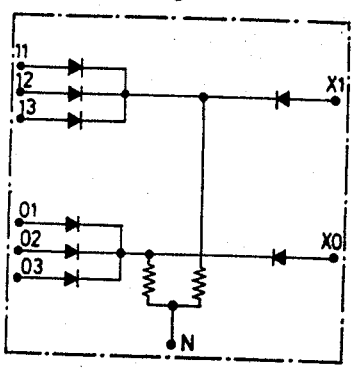
Figure 2B:
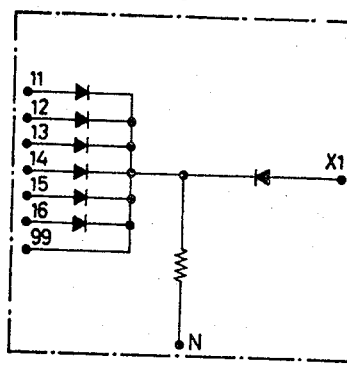

This application is a continuation of S.N. 294,916 filed July 15, 1963, now abandoned.

The invention disclosed herein is concerned with a circuit arrangement for supplying current for the operation of transmitters of desired power, wherein voltage sources have to be connected to the amplifier tubes in definite predetermined sequence. In order to avoid damage to or destruction of parts of a transmitter system, especially in the case of a costly high-power transmitter, it is not only necessary that the rules for the proper operative connection of the voltage sources be absolutely faithfully observed, but that attention is also paid to operational effects occurring incident to the connection (switching-in) of the voltage sources and deviating from the normal operation. A corresponding supervision of the operations by operating personnel cannot be effected in the case of unattended transmitter stations, and does not always give sufficient security for proper operation even in cases in which it can be applied.

Remote control and supervision with the aid of electromechanical control-and-protection circuits requires a great expenditure with respect to relays, circuit protectors and switches with a multitude of interlinking functions resulting, moreover, in operational uncertainty which grows with the number of electrical contacts subjected to external influences such as moisture, contamination and chemical alteration of contact points.

Details and features of the invention will appear from the claims and from the description of an embodiment thereof which is rendered below with reference to the accompanying drawings.

FIG. 1 shows a block circuit diagram of an arrangement for operatively connecting the supply voltages of a transmitter; and FIGS. 2a to 2f indicate circuits of component groups employed in connection with FIG. 1.

Circuit details which are unnecessary for the understanding of the invention have been omitted from the drawing shown in FIG. 1 so as to keep it simple.

The circuit arrangement according to the invention avoids the previously noted drawbacks while satisfying all requirements as to security and reliability of operation, by the use of component groups comprising active and passive elements which are operable without the use of contacts, for example, transistors, diodes, said groups being controllable by signal (control signal; null signal) and forming a sequence circuit for automatically operatively connecting to the amplifier tubes, in a definite predetermined sequence, the voltage sources for the current supply, there being first connected the heating circuit of the respective indirectly or directly heated tubes, by means of And-gates (U5I, U5II), depending upon the operation of cooling means, whereupon the grid voltage, the anode-and-screen grid voltage and the high frequency control are successively connected with the aid of one or more time flip-flop devices (U7, U9) which cooperate with delay members (U8, U10) for the consideration of the preheating time, and with the aid of a plurality of And-gates (U11, U12, U13, U14), in accordance with the supply voltages which are made available in the desired sequence.

In accordance with an advantageous embodiment of the invention, the operative connection or switching-in of the current supply is effected by means of a main switch via and And-gate, preferably in connection with a power stage, additional circuit or switching criteria, for example, criteria depending upon the actuation of danger keys, door contacts, etc., being conducted to one of the inputs of the And-gate via a signal reversal stage and a memory stage.

The operative connection of the heating circuit of directly heated tubes is, aside from the operation of the cooling device, supervised via a memory at least at one of the inputs of the And-gate, depending upon several criteria, for example, anode temperature of the terminal tubes, temperature of the cooling medium, failure of the grid bias, etc.

The circuit arrangement according to the invention can be constructed in particularly advantageous manner by the use of exchangeable component groups known under the trade name Simatic. These component groups consist of fixedly embedded circuit parts operating exclusively without the use of contacts and being largely immune to external influences. Such a construction of the circuit arrangement for the current supply secures prolonged unattended operation free of wear. The construction of the circuit arrangement is particularly readily comprehensible and the individual parts may be spatially disposed as desired.

The entire control operation incident to the operative connection of the supply voltages of the transmitter are based upon a linking of time-independent logical and time-dependent basic functions which are effected by the component groups indicated in the block diagram shown in FIG. 1. The respective component groups include And-gates X, reversal stages N, monostable multivibrator circuits K, delay members TK and memory M. The functions of these component groups will be explained with reference to FIGS. 2a to 2f.

The transistors and diodes of the component groups are operatively controlled by signals (control signal; null signal). A current supply part (not shown) delivers the operating voltages required for the entire control device, such voltages being conducted to the terminals P, Mp, NI and NII indicated in the various figures and effecting in the form of signals the operative actuation of the circuit elements. The terminal P carries a positive voltage of +24 volts with respect to the terminal Mp, the ground potential of which is referred to as null signal. The terminals NI and NII carry with respect to the terminal Mp a negative voltage of —24 volts which is hereinafter referred to as control signal.

The And-gates X (FIGS. 2a-2b) deliver at the output X1 or X0 a control signal (—24 volts) when there is control signal respectively on all the inputs 11, 12, 13, 01, 02, 03, 11 to 16 and 99. Upon appearance of a null signal at one of the inputs, the control signal will disappear at the output of the And-gate.

Figure 2C:
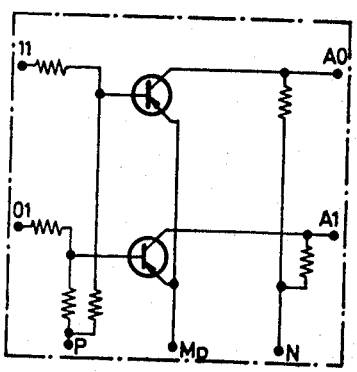
Figure 2D:
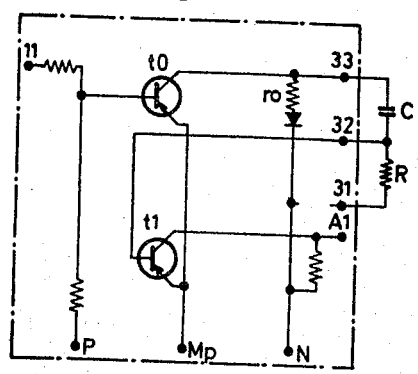
Figure 2E:
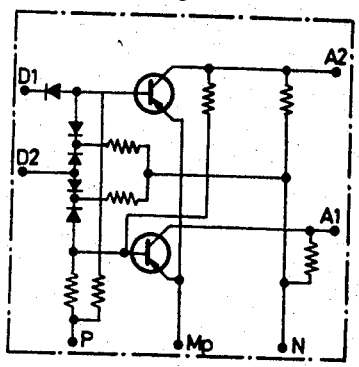
Figure 2F:
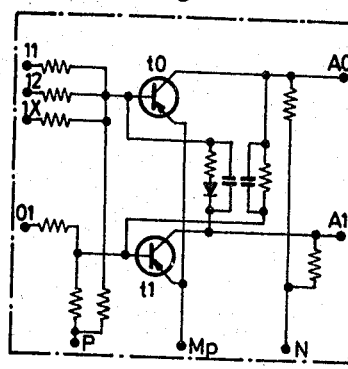

FIG. 2c shows a reversal stage N. The reversal stage requires at the output A0 or A1 the inverse input signal. Accordingly, the output A0 or A1 shall carry control signal when there is null signal at the input 11 or 01, and carries null signal when there is control signal at one of its inputs. When the transistor of this circuit is at cutoff, there will be via a resistor a potential N on the output A0 or A1. Accordingly, the output carries control signal (−24 volts). However, if there is control signal on one of the inputs, there will flow a control current by way of the emitter-base path, the transistor will become conductive and the collector will assume the potential $Mp$. At the output will appear null signal.

The monostable multivibrator circuit K (timing stage in FIG. 2d) is based upon a time function. The timing stage is to maintain a signal only for a definitely determinable adjustable time interval. There is for this purpose used a monostable flip-flop circuit with an exterior RC-member. Responsive to a null signal at the input 11, the transistor $t1$ will be conductive as it receives a control current via the resistor R. The output A1 therefore carries null signal. The coupling of the base of the transistor $t1$ with the collector of the transistor $t0$ is effected by way of a capacitor C which is on the voltage (−24 volts at 33, $Mp$ at 32). The potential $Mp$ on the terminal 32 is attained via the base current of the transistor $t1$. Assuming control signal to be on the input 11, the transistor $t0$ will become conductive. The collector receives the potential $Mp$. The potential at 32 becomes by the charge of the capacitor strongly positive with respect to $Mp$ and puts the transistor $t1$ immediately on cutoff. Accordingly, a control signal will appear at the output A1. The charge on the capacitor C is now by way of the resistor R changed corresponding to the voltage at the resistor $r0$ and permits the potential at the terminal 32 to move in negative direction, the transistor becoming conductive again when the potential is sufficiently negative. The control signal at the output A1 disappears. The duration of the control signal at the output A1 is determined by the capacitance of the capacitor C and the magnitude of the resistor R and can vary from fractions of a second to several seconds.

Another form of timing stage is represented by the delay device TK (FIG. 2e) which effects in connection with the flipper member K an adjustable signal delay. Upon interconnecting the time flipper circuit K with the delay member TK, a control signal appearing at the input 11 of the flipper circuit effects at the output A1 of the delay member a control signal determined by the RC-combination of the flipper circuit, and at the same time appearance of a null signal for the same time interval, at the output A2 of the delay member TK. At the lapse of the predetermined time, there is effected a signal reversal at the outputs A1 and A2 so that a control signal appears at the output A2 so long as there is a control signal at the input 11 of the flipper circuit.

The memory M (FIG. 2f) has the function of a storer. Upon operatively connecting the current supply, there is effected, by the operation of suitable circuit means, a condition in which the transistor $t1$ is made conductive while the transistor $t0$ is put at cutoff. It is thereby assumed that there is no control signal on any of the inputs 11, 12, 1X and 01. This condition is maintained since there is a control signal at the output A0, producing control current for the transistor $t1$ via the Or- input. The same condition is attained by the action of a control signal at the input 01. The control signal is maintained at the output A0 even upon disappearance of the input signal. The output A0 will carry null signal only when control signal is connected to one of the inputs 11, 12 or 1X.

The operation of the above described individual component groups has already been explained in the Siemens Zeitschrift of October 1959.

The following switching conditions are to be considered in connection with the operative connection (switching-in) of a transmitter:

Off-Preheating-Operation N/3-Operation N.

In the "Off" condition, the main switch (not shown) in the transmitter power supply, is released so that all voltages above 24 volts are disconnected.

In the "Preheating" condition, the main switch and the heater voltage for all indirectly heated tubes are switched in; the same applies to aerators that may be required for these tubes.

In the condition "Operation N/3," are switched in, in predetermined sequence, the heater voltage for directly heated tubes as well as the appropriate aerator and all grid- anode- and screen grid voltages. The anode voltage of the power tube is with the aid of a λ-circuit of the primary windings of the associated network transformer, reduced to ⅓ of the rated voltage, thus also reducing power output to ⅓ of the rated power.

In the condition "Operation N," the anode voltage of the power tube is by Δ-circuit of the primary windings of the associated network transformer, increased to the full voltage, the output power then corresponding to the rated power.

The individual circuit or switching conditions are by means of a circuit arrangement (interlock device) shown in FIG. 1, obtained as follows:

In the "Off" position, there is transmitted, via a make contact (not shown) and via the terminal 3, control signal NI (−24 volts) to the input IX of the stage U3 (memory). Accordingly, null (zero) signal will appear at the output A0 of the stage U3 and also at the ouput X1 of the stage U4I, such signal releasing the main switch. The main switch is also released upon actuation of a danger key $g$ (top left in FIG. 1) or upon opening of a door contact $t$. Control signal is placed on the input 11 of the reversal stage U1I, via serially disposed break contacts of the danger keys $g$, and control signal is also placed via serially disposed door contacts $t$, on the input 01 of the reversal stage U1II. Upon interruption of the danger- or door contact loop by the opening of a contact $g$ or $t$, there will appear control signal at the output A0 or A1 of the reversal stage U1 and null signal will appear at the input 11 or 12 of the stage U3 (memory M) as well as at its output A0. A reconnection is possible only responsive to actuation of the "Off" key and consequent restoration of the stage U2. The stage U3 (memory M) can then be reset via U2 so that control signal will again appear at the output A0.

In the condition "Preheating," there is extended via terminal 4 extended control signal to the input 13 of the stage U4I (And-gate X) and to the input 11 of the stage U5I (And-gate X). In case control signal is also at the output A0 of the stage U3 (memory M), there will be operatively connected the main switch and aerator for cooling the indirectly heated tubes, such connection being effected via the stage U4I, terminal 25 and a power stage serially connected therewith. Upon closure of contact $w1$, actuated by the aerator, control signal is via terminal 8 connected to the input 13 of the stage U5I (And-gate X). Control signal will appear at the output X1 of this stage, such signal being effective to operatively connect via terminal 29 and a power stage serially related thereto, a switching relay for the heating voltage of the indirectly heated tubes. The primary current of the heating transformers is supervised and causes connection by way of terminal 10, of control signal to the input 11 of the stage U7 (flip-flop circuit K). After the lapse of a time interval which is adjustable by the RC-combination W2, C2, between 10 and 60 seconds, there will appear control signal at the output A2 of the stage U8 (delay device TK), which control signal is required for the subsequent operative connection of the anode- and screen grid voltages.

In the condition "Operation N/3," there is extended control signal via the terminal 7, which maintains the condition "Preheating" by way of the barrier rectifiers Gr3 and Gr1, while causing via the terminal 27 connection of a protective device for the λ-circuit of the primary windings of the network transformer for the anode voltage and via terminal 28 a protective device for a second aerator for the cooling of the directly heated tubes. Closure of the contact w2, controlled by this aerator, effects connection of control signal via the terminal 9 to the input 02 of the stage U5II (And-gate X), so that control signal is now connected to all inputs of this stage. The input 03 of the And-gate receives control signal from the output A0 of the memory U6. Control signal is at the output X0 of the stage U5II (And-gate) and protective device for the heating voltage of the directly heated tubes is accordingly operatively connected via the terminal 30.

The primary current of the associated heating transformers is supervised and causes connection of control signal via terminal 11 to the input 11 of the stage U9 (flip-flop circuit K). After the lapse of a time interval of 10 seconds, determined by the RC-combination W3, C3, there will be control signal at the output A2 of the stage U10 (delay device TK), which control signal is extended to the input 02 of the stage U11II (And-gate) and also to the input 11 of the stage U12 (And-gate). The output X0 of the stage U11II carries control signal which causes operative connection via terminal 39, of a protective device for the grid bias voltages. The presence of grid bias voltages is signalled back by a control signal extended via terminal 13, to the input 11 of the stage U11I (And-gate). If there is control signal from a re-connection- counting- and blocking device, lying via terminal 24 at the input 12 of the stage U11I (And-gate), which control signal disappears upon blocking, the output X1 of the stage U11I will carry control signal. A grounding switch will be operatively connected via terminal 38, such switch in released condition short circuiting the high tension. The criterion "grid bias voltage present" is at the same time given to the stages U12, U13 and U14 (And-gates) so as to effect the operative connection of the anode- and screen grid voltages as well as the high frequency control. The anode voltages for the preamplifier and the terminal amplifier are connected via the output X1 of the stage U12 and terminal 37, if control signal is at all inputs of the stage U12, such control being connected responsive to the following criteria: Termination of the heating interval of 10 seconds (input 11); motor-driven tuning elements of the amplifier in normal or resting position (input 12, terminal 15); termination of the preheating interval of 10 ... 60 seconds (input 13); grounding switch open (input 14, terminal 16); control signal from the reconnection-, counting- and blocking device, which disappears momentarily responsive to tube shunts and permanently responsive to blocking (input 15, terminal 14); and grid bias voltage present (input 16, terminal 13).

Via the output XI of the stage U13 (And-gate) and the terminal 36, is connected the screen grid voltage, provided that control signal is on all inputs of such stage, which signal is operatively connected responsive to the following criteria: Grid bias voltage present (input 11, terminal 13); motor-driven tuning elements of the amplifier in normal or resting position (input 12, terminal 15); exterior interlock loop, for example, for the interlock of the artificial antenna, the antenna selector switch, or the like, closed (input 13, terminal 19); anode voltage for preamplifier present (input 14, terminal 18); anode voltage for terminal amplifier present (input 15, terminal 17); control signal from the reconnection-, counting- and blocking device, which disappears briefly responsive to tube shunts and finally responsive to blocking (input 16, terminal 14).

The high frequency control for the amplifier is effected via the output X1 of the stage U14 and the terminal 35, provided that there is control signal at all inputs of the stage U14, which signal is operatively connected responsive to the following criteria: Control signal from the detuning protector, which disappears briefly responsive to a given mis-matching of the amplifier output with respect to the antenna cable (input 11, terminal 21); anode voltage for the preamplifier present (input 12, terminal 18); anode voltage for the terminal amplifier present (input 13, terminal 17); motor-driven tuning elements of the amplifier at normal (input 14, terminal 15); screen grid voltage present (input 15, terminal 20); control signal from the reconnection-, counting- and blocking device, which signal disappears briefly responsive to tube shunts and finally responsive to blocking (input 16, terminal 14); grid bias voltage present (input 99, terminal 22).

In the condition "Operation N," there is control signal connected to the terminal 5, which signal releases, via the blocking rectifiers Gr2 and Gr1, the switching functions as described in connection with the condition "Operation N/3." However, the λ-protecting device which had been in operation, is disconnected since there is no control signal on the terminal 27. The release is signalled to the input 03 of the stage U4II (And-gate) by a control signal extended via the terminal 6. There appears at the same time control signal at the output X0 of this stage, which signal effects via the terminal 26 and a serially disposed power stage, operative switching of a protective device, so that the anode voltage of the terminal amplifier is now increased to the full voltage.

In the event of disturbance, the stages which depend upon the disturbed value are blocked and the protective devices controlled via the outputs of such stages are caused to restore to normal. However, it is for the protection of component parts and tubes required to disconnect in case of disturbance as quickly as possible, the anode- and screen grid voltages and to simultaneously effect blocking of the high frequency control. Switching-in criteria are for this purpose connected to the inputs of several stages. For examples, upon failure of the grid voltage, the anode- and screen grid voltages are simultaneously disconnected, the anode voltage for the terminal amplifier is grounded with the aid of the grounding switch, and the high frequency control is blocked. Upon actuation, responsive to tube shunts, of the re-connection-, counting- and blocking device, the anode- and screen grid voltages are briefly disconnected and the high frequency control is blocked; upon blocking, the voltages remain disconnected and the anode voltage for the terminal amplifier is grounded at the grounding switch.

Further disturbances which may occur in connection with the terminal amplifier tube are supervised with the aid of the stage U6 (memory M).

Upon failure of the tube fuse, which is to operate when the maximum permissible temperature of the anodes is exceeded, there is extended control signal via the terminal 31 to the input of the memory M (U6); when the maximum permissible temperature of waste or exhaust air is exceeded, there will appear via terminal 32, control signal at the input 12, and upon failure of the heating after operative connection of the anode voltage, there will appear control signal at the input 1X via the terminal 33. The output A0 of the stage U6 carries in all cases of disturbances null signal which effect via the stage U5II (And-gate), disconnection of the protecting device for the heating voltage of the directly heated terminal amplifier tube. The grid voltage, the anode voltages and the screen grid voltage are consequently disconnected and the high frequency control is blocked. A re-connection is possible only responsive to extension, via a special reset switch or in the condition "Preheating," of control signal via terminal 34, to the input 01 of the stage U6 (memory M).

The control voltage NI (−24 volts) is supplied to the stages U1, U2 and U4 directly from the network device disposed ahead of the main switch, while the control voltage NII is for all other stages supplied via an auxiliary contact of the main switch.

Changes may be made within the scope and spirit of the appended claims which define what is believed to be new and desired to have protected by Letters Patent.

The invention claimed is:

1. A circuit arrangement for current supply of transmitters which have high power amplifiers, anode supplies, heater supplies, grid biases, screen grid voltages, and high voltage preamplifiers in which the supply voltages are connected to the amplifier tubes thereof in dependence of various circuit conditions characterized by the predominant use of active and passive logic structural groups which are controllable by signals indicative of said circuit conditions, and which effects an automatic connection of the supply voltages in a fixed sequence while simultaneously taking into consideration a number of protective conditions for various different control operating states such as preheating of the tubes (Preheating), sending operation with reduced power (Operation N/3), sending operation with full power (Operation N) in switching steps, comprising: means producing a signal for each of said control operating states, (a) first "and" gate means for effecting, during each of said three operating states, actuation of a main switch circuit when the input requirements of said first "and" gate means have been satisfied, the gate inputs thereof being responsive to any of the respective control state signals and the protective conditions whereby actuation of said main switch is effected only when the inputs of said first "and" gate sense the control state and the protective conditions;

(b) second "and" gate means for effecting during the operating state "Operation N," connection of normal anode supply voltage to the amplifier tubes when the input requirements of said second "and" gate means are satisfied, the gate inputs thereof being responsive to the "Operation N" control state and to the reduced voltage "Operation N/3" control state whereby the connection of the anode supply to the tubes is effected only when the inputs of said second "and" gate means senses the desired control state and presence of the anode supply voltage;

(c) third "and" gate means for effecting connection of the heater voltage for indirectly heated tubes, when the input requirements of said third "and" gate are satisfied, the inputs thereof being responsive to the "Operation preheating" control state and a predetermined condition circuit for connection of the heater voltage of the indirectly heated tubes;

(d) fourth "and" gate means for effecting operative connection of the heater voltage for the higher power amplifier when the input requirements of said fourth "and" gate are satisfied, the gate inputs thereof being responsive to the "Operation N" and "Operation N/3" control state and second predetermined condition circuits for connection of the heater voltage for directly heated tubes;

(e) fifth "and" gate means for effecting, in predetermined sequence, connection of the grid bias voltage, screen grid voltage and the anode voltage of the respective tubes when the input requirements of said fourth gate means have been satisfied, the gate inputs thereof being responsive to respective monitoring and protective circuits for connecting the grid bias voltage, screen grid voltage, and anode voltage;

(f) sixth "and" gate means for actuation of a ground switch in the anode circuit, when the input requirements of said sixth "and" gate means have been satisfied, the gate inputs thereof being responsive to a loss of grid bias and the conditions of the second set of protective circuits whereby the anode voltage is grounded; and (g) seventh gate means for connecting high frequency voltage to a high voltage preamplifier.

2. A circuit according to claim 1, wherein the protective circuits connected to inputs of said first "and" gate means comprise at least one protective door circuit and a "danger" circuit, reversal circuits of the respective inputs of which said door and danger circuits are operatively connected, and a corresponding memory circuit operatively connected to each reversal circuit, and the corresponding output of each memory circuit being operatively connected to a negative input of said first gate means.

3. A circuit according to claim 1, wherein said predetermined condition circuits connected to an input of said third "and" gate means comprises an air pressure responsive device responsive to cooling air flow at tubes of preamplifier stages.

4. A circuit according to claim 1, wherein the predetermined condition circuits connected to inputs of said fourth "and" gate means respectively comprise a circuit including an air pressure responsive device responsive to cooling air flow at a tube of the output stage, a circuit including a fusible element associated with an end stage tube, and a circuit including a contact thermometer responsive to the temperature of such cooling air flow, the connections to inputs of such fourth "and" gate means of the respective operating state circuits being effected over a plurality of diodes.

5. A circuit according to claim 1, wherein the monitoring circuits connected to inputs of said both fifth "and" gate means includes the voltage supply circuits of the respective transmitter stages.

6. A circuit according to claim 1, wherein the monitoring circuits connected to inputs of said fifth "and" gate means for connecting the anode voltage includes respective timing and delay circuits for the directly and indirectly heated tubes, to take account of the preheating time thereafter.

7. A circuit according to claim 1, comprising respective amplifiers in the output circuits of the respective "and" gate means, and a corresponding actuating relay connected to each amplifier output, for effecting the specified operating results.

References Cited

UNITED STATES PATENTS

| | | | |
|---|---|---|---|
| 2,217,628 | 10/1940 | Usselman et al. | 325—187 X |
| 2,816,180 | 12/1957 | French | 325—151 X |
| 3,147,400 | 9/1964 | McClay | 307—202 X |

ROBERT L. GRIFFIN, *Primary Examiner.*

B. V. SAFOUREK, *Assistant Examiner.*

U.S. Cl. X.R.

307—202; 317—33; 325—149, 187; 328—9